UNITED STATES PATENT OFFICE.

HOWARD B. BOND, OF TERREBONNE PARISH, ASSIGNOR TO HIMSELF AND JAMES B. PRICE, OF NEW ORLEANS, LOUISIANA.

IMPROVEMENT IN DEFECATING AND BLEACHING SACCHARINE MATTERS.

Specification forming part of Letters Patent No. 118,427, dated August 29, 1871.

*To all whom it may concern:*

Be it known that I, HOWARD B. BOND, of the parish of Terrebonne and State of Louisiana, have discovered a new, useful, and Improved Method of Defecating or Bleaching Cane-Juice, and all other Saccharine Liquids, Substances, or Matter; and I do hereby declare the following to be a full, clear, and correct description of the said invention or discovery.

My invention consists in the use of bisulphide or bisulphuret of carbon, in a liquid or gaseous form, for defecating purposes; and it is applied to practice by the subjection of the liquid or semi-liquid substances to be purified or freed from foreign and extraneous matter or impurities, to the direct action of the bisulphuret of carbon, in such a manner that every particle or portion of the same may be brought into actual or positive contact with the said gas at the same or at very near the same moment of time, and thus—either by precipitation or decantation, when the feculent matter may be deposited at the bottom of the apparatus or vessel containing the liquid or substance; by despumation or boiling, fermentation and skimming; by fining or clarification; by filtration, or by any other means or process, mechanical or otherwise, which in practice may be found as economical, efficient, thorough, and as expeditious—a method of depuration is effected or accomplished. It being clearly obvious that the mechanical agencies or means through which my invention may be applied to practical use and operation may be almost unlimitedly and indefinitely diversified, varied, or changed, no description of any particular mechanical organism suitably adapted to such purpose need be herein given. Provided the defecation or depuration is effected by the use and application of the bisulphide or bisulphuret of carbon, as aforesaid, it makes no difference what may be the mechanical means employed to accomplish the result sought to be attained.

The cane-juice or other substances to be operated upon may be impregnated to the required extent with the gas by being made to fall in small or minute particles through a space or vessel filled with said gas, or the gas may be artificially forced through the substance to be purified or defecated, whether the said substance be contained in stationary vats provided with agitators to induce diffusion, or in revolving cylindrical reservoirs either with or without a perforated perimeter or in any other suitable apparatus or receptacle for the same.

Having thus described my invention, what I claim, and desire to secure by Letters Patent, is the following:

The process of defecating or bleaching saccharine liquids, substances, or matter with bisulphide or bisulphuret of carbon, either in a gaseous or liquid form, substantially as described.

HOWARD B. BOND.

Witnesses:
H. N. JENKINS,
C. W. WAILEY.